(12) United States Patent
Huang et al.

(10) Patent No.: US 11,734,892 B2
(45) Date of Patent: Aug. 22, 2023

(54) METHODS FOR THREE-DIMENSIONAL RECONSTRUCTION OF TRANSPARENT OBJECT, COMPUTER DEVICES AND STORAGE MEDIUMS

(71) Applicant: SHENZHEN UNIVERSITY, Shenzhen (CN)

(72) Inventors: Hui Huang, Shenzhen (CN); Bojian Wu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 326 days.

(21) Appl. No.: 16/486,500

(22) PCT Filed: Jul. 26, 2018

(86) PCT No.: PCT/CN2018/097225
§ 371 (c)(1),
(2) Date: Sep. 23, 2021

(87) PCT Pub. No.: WO2020/019245
PCT Pub. Date: Jan. 30, 2020

(65) Prior Publication Data
US 2022/0139039 A1  May 5, 2022

(51) Int. Cl.
*G06T 17/00* (2006.01)
*G06T 19/00* (2011.01)
(Continued)

(52) U.S. Cl.
CPC .............. *G06T 19/00* (2013.01); *G06T 5/002* (2013.01); *G06T 15/06* (2013.01); *G06T 17/00* (2013.01)

(58) Field of Classification Search
CPC .......... G06T 17/00; G06T 17/20; G06T 7/50; G06T 7/55; G06T 7/564; G06T 7/596; G06T 7/75
See application file for complete search history.

(56) References Cited

U.S. PATENT DOCUMENTS

| | | | |
|---|---|---|---|
| 2006/0104503 A1 | 5/2006 | Huang et al. | |
| 2017/0302902 A1* | 10/2017 | Martinello | ........... H04N 13/363 |
| 2018/0096463 A1 | 4/2018 | Kim et al. | |

FOREIGN PATENT DOCUMENTS

| | | |
|---|---|---|
| CN | 101271591 A | 9/2008 |
| CN | 101533521 A | 9/2009 |

(Continued)

OTHER PUBLICATIONS

Bojian Wu et al.,"Full 3D Reconstruction of Transparent Objects", ACM transactions on Graphics, vol. 37, No. 4, Article 103, total 11 pages, Aug. 2018.

(Continued)

*Primary Examiner* — Ryan McCulley
(74) *Attorney, Agent, or Firm* — Kilpatrick Townsend & Stockton, LLP

(57) ABSTRACT

The present application relates to methods and apparatuses for three-dimensional reconstruction of a transparent object, computer devices, and storage mediums. The method includes acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing; acquiring surface normal vectors and Snell normal vectors of the initial rough transparent object model in camera device views, and performing a first optimization on the initial rough transparent object model by constraining consistency between the surface normal vectors and the Snell normal vectors of the initial rough transparent object model in the camera device views, and acquiring a point cloud reconstruction model; acquiring Poisson sample points of the initial rough transparent object model, and updating the (Continued)

point cloud reconstruction model according to the Poisson sample points.

11 Claims, 5 Drawing Sheets

(51) Int. Cl.
    *G06T 5/00*     (2006.01)
    *G06T 15/06*    (2011.01)

(56) References Cited

FOREIGN PATENT DOCUMENTS

| CN | 102915559 A | 2/2013 |
| CN | 105488843 A | 4/2016 |
| CN | 106780726 A | 5/2017 |
| CN | 106959078 A | 7/2017 |
| CN | 107240148 A | 10/2017 |
| CN | 107607040 A | 1/2018 |
| TW | 201017578 A | 5/2010 |

OTHER PUBLICATIONS

Yiming Qian et al.,"3D Reconstruction of Transparent Objects with Position-Normal Consistency", 2016 IEEE Conference on Computer Vision and Pattern Recognition, total 9 pages.

Yonghao Yue et al.,"Poisson-Based Continuous Surface Generation for Goal-Based Caustics", ACM transactions on Graphics, vol. 33, No. 3, Article 31, total 7 pages, May 2014.

Kai Han et al.,"Dense Reconstruction of Transparent Objects by Altering Incident Light Paths Through Refraction", Int J Comput Vis (2018) 126:460-475, total 16 pages.

Yijun Ji et al.,"Fusing Depth and Silhouette for Scanning Transparent Object with RGB-D Sensor",International Journal of Optics, vol. 2017,Article ID 9796127, 12 pages.

* cited by examiner

METHODS FOR THREE-DIMENSIONAL RECONSTRUCTION OF TRANSPARENT OBJECT, COMPUTER DEVICES AND STORAGE MEDIUMS

CROSS-REFERENCE TO RELATED APPLICATIONS

This application is a U.S. National Stage of International Application No. PCT/CN2018/097225, filed on Jul. 26, 2018, which is hereby incorporated by reference in its entirety.

TECHNICAL FIELD

The present application relates to the field of image processing, and in particular to methods for three-dimensional reconstruction of a transparent object, computer devices, and storage mediums.

BACKGROUND

The three-dimensional reconstruction refers to establishing a mathematical model that is suitable for computational representation and processing of a three-dimensional object, which is the basis for processing, operating and analyzing its properties in a computational environment, and is also a key technology for establishing a virtual reality expressing an objective world in a computer.

Numerous techniques have been proposed for reconstructing three-dimensional models for opaque objects (such as Lambertian surfaces) in past decades. However, none of them can be directly applied to transparent objects, and conventional three-dimensional reconstruction algorithms thus cannot work properly to reconstruct a transparent object.

SUMMARY

Accordingly, it is necessary to provide methods and apparatus for three-dimensional reconstruction of a transparent object, computer devices, and storage mediums in view of the above-mentioned technical problems.

A method for three-dimensional reconstruction of a transparent object is provided, the method includes:

acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;

acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;

acquiring Poisson sample points of the initial rough transparent object model, and updating the point cloud reconstruction model according to the Poisson sample points;

performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

An apparatus for three-dimensional reconstruction of a transparent object is also provided, the device includes:

a data preprocessing module configured to acquire silhouettes and light correspondences of a to-be-reconstructed transparent object under different viewing directions, acquire an initial rough transparent object model of the to-be-reconstructed transparent object, and filter out light rays involved in multiple refractions and total reflections by backward ray tracing;

a point cloud model generating module configured to acquire surface normal vectors and Snell normal vectors of the initial rough transparent object model of the to-be-reconstructed transparent object in camera device views, perform a first optimization on the initial rough transparent object model by constraining consistency between the surface normal vectors and the Snell normal vectors of the initial rough transparent object model in the camera device views, and acquire a point cloud reconstruction model;

a point cloud model optimizing module configured to acquire Poisson sample points of the initial rough transparent object model, and update the point cloud reconstruction model according to the Poisson sample points;

a point cloud model constraining module configured to perform a second optimization on the updated point cloud reconstruction model according to the silhouettes of the to-be-reconstructed transparent object and the projections of the updated point cloud reconstruction model; and a three-dimensional reconstruction module configured to perform a three-dimensional reconstruction on the optimized point cloud reconstruction model after the second optimization to obtain a three-dimensional model.

A computer device is further provided, including a memory and a processor, the memory storing a computer program when executed on the processor causes the program to perform the steps of:

acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;

acquiring surface normal vectors and Snell normal vectors of the initial rough transparent object model of the to-be-reconstructed transparent object in camera device views, and performing a first optimization on the initial rough transparent object model by constraining consistency between the surface normal vectors and the Snell normal vectors of the initial rough transparent object model in the camera device views, and acquiring a point cloud reconstruction model;

acquiring Poisson sample points of the initial rough transparent object model, and updating the point cloud reconstruction model according to the Poisson sample points;

performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

A computer-readable storage medium is further provided, storing a computer program which when executed on a processor causes the processor to perform the steps of:

acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;

acquiring surface normal vectors and Snell normal vectors of the initial rough transparent object model of the to-be-reconstructed transparent object in camera device views, and performing a first optimization on the initial rough transparent object model by constraining consistency between the surface normal vectors and the Snell normal vectors of the initial rough transparent object model in the camera device views, and acquiring a point cloud reconstruction model;

acquiring Poisson sample points of the initial rough transparent object model, and updating the point cloud reconstruction model according to the Poisson sample points;

performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

According to the method and apparatus for three-dimensional reconstruction of a transparent object, computer device, and storage medium, silhouettes and light correspondences of the transparent object under different viewing directions are acquired, light rays involved in multiple refraction and total reflection in the light rays in the light correspondence are filtered out by backward ray tracing, and Snell normal vectors and surface normal vectors of the initial rough transparent object model in the camera device views are acquired, then through enforcing the consistency between the Snell normal vectors and the surface normal vectors, a point cloud reconstruction model is acquired, so that the light correspondences are fully utilized. And after surface projection and smoothing process, as well as the silhouette consistency constraining, the point cloud reconstruction model is optimized and a three-dimensional model is then reconstructed, so the entire surface of the to-be-reconstructed transparent object can be restored.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

The method for three-dimensional reconstruction provided in the present application is used for three-dimensional reconstruction of a transparent object. Specifically, the method for three-dimensional reconstruction of the present application may be implemented through a computer program. The computer program may be loaded onto a terminal, which may be, but not limited to various personal computers, laptops, smartphones, and tablet computers.

Figure 1:
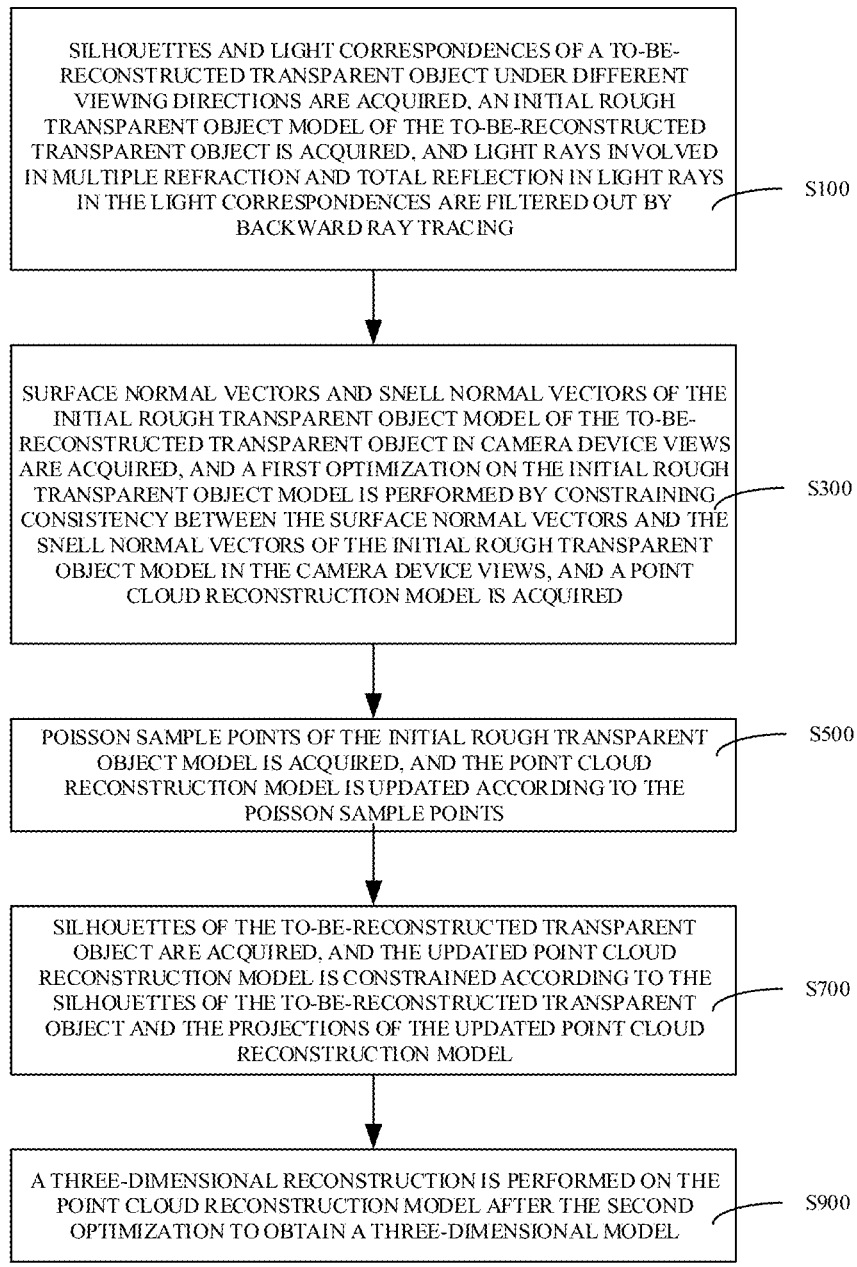
FIG. 1 is a flow diagram of a method for three-dimensional reconstruction of a transparent object according to an embodiment.

As shown in FIG. 1, in an embodiment of the present application, a method for three-dimensional reconstruction of a transparent object includes following steps.

At step S100: silhouettes and light correspondences of a to-be-reconstructed transparent object under different viewing directions are acquired, an initial rough transparent object model of the to-be-reconstructed transparent object is acquired, and light rays involved in multiple refraction and total reflection in light rays in the light correspondences are filtered out by backward ray tracing.

At step S300: surface normal vectors and Snell normal vectors of the initial rough transparent object model of the to-be-reconstructed transparent object in camera device views are acquired, and a first optimization on the initial rough transparent object model is performed by constraining consistency between the surface normal vectors and the Snell normal vectors of the initial rough transparent object model in the camera device views, and a point cloud reconstruction model is acquired.

The to-be-reconstructed transparent object refers to a target object for three-dimensional reconstruction. The method for three-dimensional reconstruction is used to perform three-dimensional reconstruction of the to-be-reconstructed transparent object to obtain a three-dimensional model of the to-be-reconstructed transparent object. The initial rough transparent object model refers to an initial rough transparent object model of the to-be-reconstructed transparent object. In an embodiment, an initial rough transparent object model represented by a visual convex hull may be calculated by acquiring the silhouette of the to-be-reconstructed transparent object at each viewing direction, and then by a spatial carving algorithm. The surface normal vectors are normal vectors obtained according to the surface shape. The Snell normal vectors are normal vectors estimated according to the Snell law. The point cloud reconstruction model is a model obtained by enforcing the consistency between the surface normal vectors and the Snell normal vectors of the initial rough transparent object model in the camera device views.

Figure 2:
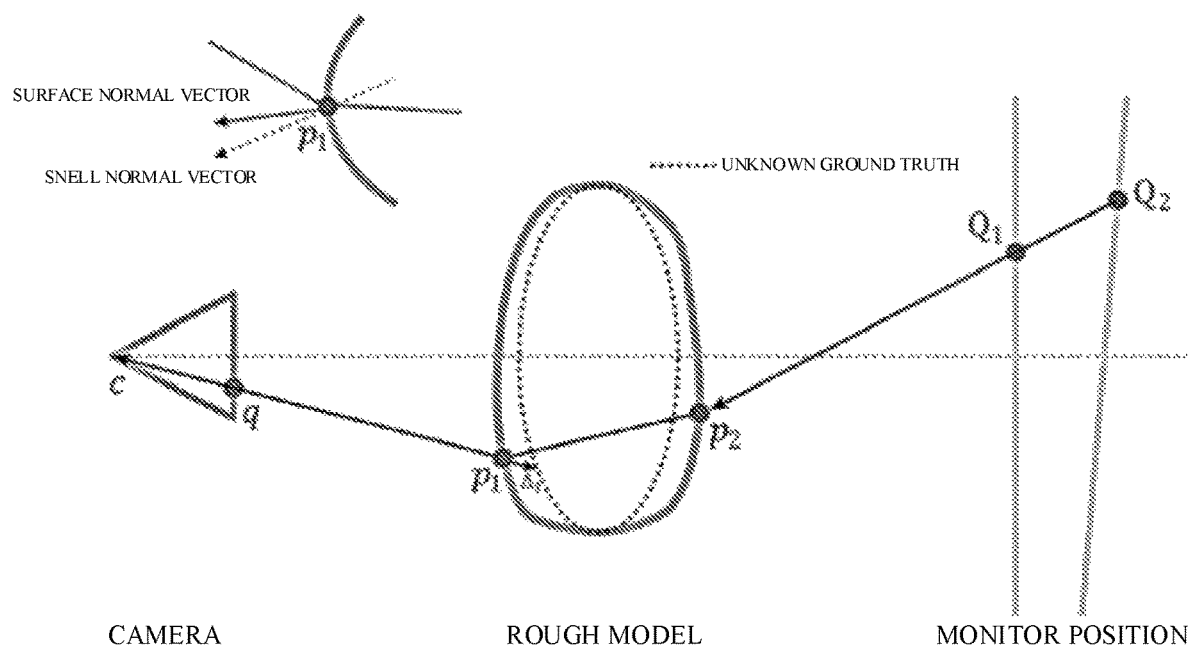
FIG. 2 is a schematic view of a light correspondence in a method for three-dimensional reconstruction of a transparent object according to an embodiment.

A given initial rough transparent object model, i.e., an initial rough transparent object model is shown in FIG. 2. By way of example, the camera device is a camera, assuming that the camera satisfies the principle of pinhole imaging, and each ray of light emitted from the camera projection center through each pixel on the camera imaging plane intersects the initial rough transparent object model. The backward ray tracing is performed in each camera view angle to obtain the position of the point of intersection between the inverse ray of each outgoing light and the initial rough transparent object model. Starting from the initial rough transparent object model, the light intersecting the object and refracting more than twice can be removed by backward ray tracing. As for each inverse outgoing light, the distance between the intersection and the projection center of the camera is referred to as the depth value of the inverse outgoing light, so that the optimization target from the initial rough transparent object model to the point cloud reconstruction model can be converted to the depth value optimization corresponding to each of the inverse outgoing rays. The depth value corresponding to each inverse outgoing light can be optimized through the following formula:

$$\min_d \sum_{i \in I} \left( \|N(i) - SN(i)\|^2 + \lambda \sum_{i' \in N_i} \|d_i - d_{i'}\|^2 \right).$$

The first item of the above formula may minimize the difference between the surface normal vector and the Snell normal vector, and the second term is used to constrain the local smoothness of the depth value. $N(i)$ represents a surface normal vector at intersections $p_i$, $SN(i)$ represents a Snell normal vector calculated at an intersection on the basis of restored light correspondences and the Snell law, and $d_i$ represents a depth value in the direction of the inverse outgoing lights and is measured by a distance between the projection center of the camera and the intersection. The set I includes light rays refracted twice, the set $N_i$ represents a neighborhood of $p_i$ in the current camera view angle, and $\|\cdot\|$ represents a standard two-norm. $\lambda=0.5$ is a default value. Both items are simultaneously optimized to obtain a depth map in each camera view angle which is directly converted to a point cloud according to the inverse outgoing light. Then, point clouds generated from different camera view angles are combined to perform three-dimensional reconstruction to obtain a point cloud reconstruction model. In an embodiment, the point cloud reconstruction model may be obtained by Poisson reconstruction. However, the point cloud reconstruction model estimated and obtained by constraining consistency between the surface normal vectors and the Snell method vectors has noise and is incomplete. The reason is that not all of the correspondence between the incident light and the outgoing light can be required inside the silhouettes, and the light refraction is very sensitive to the minor variation of the surface normal vectors. Therefore, the point cloud generated in this step will includes a great number of noises, outliers, mis-aligned errors, missing areas, and the like.

At step S500: Poisson sample points of the initial rough transparent object model is acquired, and the point cloud reconstruction model is updated according to the Poisson sample points.

The updating of the point cloud reconstruction model includes, in particular, a denoising process, a smoothing process, and the like. The denoising process refers to removing outliers from the point cloud reconstruction model, and the smoothing process is used to eliminate mis-aligned errors and missing areas of the point cloud reconstruction model, and the like, the distribution of the point clouds is maintained.

After acquiring the point cloud reconstruction model, the Poisson sample points of the initial rough transparent object model can be acquired, and the adaptive support radiuses of the Poisson sample points can be calculated. According to the adaptive support radiuses, the Poisson sample points are projected to the point cloud reconstruction model, and the point cloud reconstruction model is consolidated by eliminating noises, outliers, mis-aligned errors, missing areas, and the like in the point cloud reconstruction model.

At step S700: silhouettes of the to-be-reconstructed transparent object are acquired, and the updated point cloud reconstruction model is constrained according to the silhouettes of the to-be-reconstructed transparent object and the projections of the updated point cloud reconstruction model.

At step S900: a three-dimensional reconstruction is performed on the point cloud reconstruction model after the second optimization to obtain a three-dimensional model.

A new point cloud reconstruction model after being constrained by S700 is obtained, and a three-dimensional model is obtained by three-dimensional reconstruction. In an embodiment, a Poisson reconstruction is performed on the point cloud reconstruction model to obtain the three-dimensional model of the to-be-reconstructed transparent object.

According to the method for three-dimensional reconstruction of the transparent object, silhouettes and light correspondences of the transparent object under different viewing directions are acquired, light rays involved in multiple refraction and total reflection in the light rays in the light correspondence are filtered out by backward ray tracing, and Snell normal vectors and surface normal vectors of the initial rough transparent object model in the camera device views are acquired, then through enforcing the consistency between the Snell normal vectors and the surface normal vectors, a point cloud reconstruction model is acquired, so that the light correspondences are fully utilized. And after surface projection and smoothing process, as well as the silhouette consistency constraining, the point cloud reconstruction model is optimized and a three-dimensional model is then reconstructed, so the entire surface of the to-be-reconstructed transparent object can be restored.

In an embodiment, after S800, the method further includes:

reusing the obtained three-dimensional model as the initial rough transparent object model, returning to the step of acquiring the surface normal vectors and the Snell normal vectors of the initial rough transparent object model of the to-be-reconstructed transparent object in the camera device views, and counting the number of times of return; and when the number of times of return reaches a preset number of times, stopping returning to the step of acquiring the surface normal vectors and the Snell normal vectors of the initial rough transparent object model of the to-be-reconstructed transparent object in the camera device views.

After acquiring the three-dimensional model, the reconstructed three-dimensional model is used as the initial rough transparent object model of the next iteration, and the model surface depth value is estimated by iterating step S300. The point cloud consolidation is performed by iterating steps S500, S700, such that the reconstructed model gradually approaches the real to-be-reconstructed object. By iterating step S300, light rays refracted more than twice can be more accurately removed and better initial values can be provided for optimization. This will help to mitigate the ambiguity of the normal vectors consistency and will guarantee more accurate estimation of the depth values at the surface. The preset times of iterations may depend on the specific shape of the rough transparent object, and the more complex the profile is, the more times of iterations is during the reconstruction of the rough transparent object. The initial rough transparent object model can be better restored by iterations at the reconstructed three-dimensional model.

Figure 3:
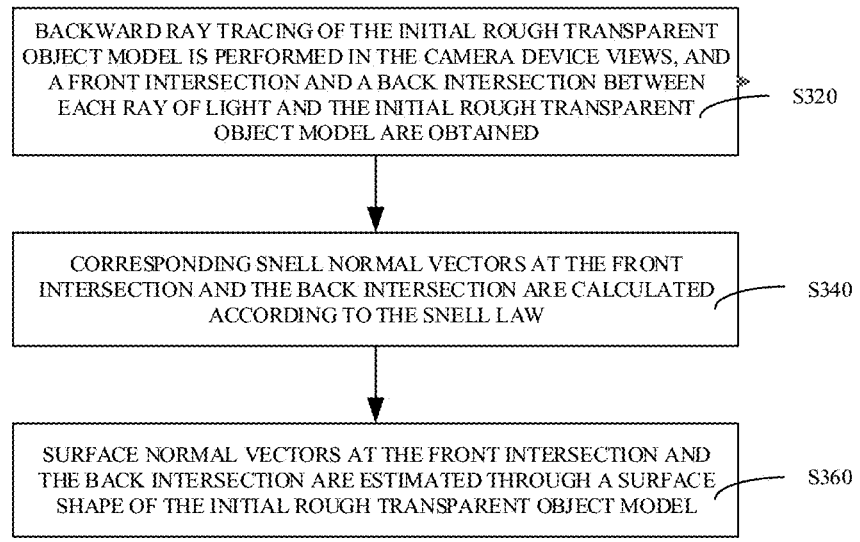
FIG. 3 is a flow diagram of step S100 according to an embodiment.

As shown in FIG. 3, in an embodiment, step S300 includes the following steps.

At step S320: backward ray tracing of the initial rough transparent object model is performed in the camera device views, and a front intersection and a back intersection between each ray of light and the initial rough transparent object model are obtained.

At step S340: corresponding Snell normal vectors at the front intersection and the back intersection are calculated according to the Snell law.

At step S360: surface normal vectors at the front intersection and the back intersection are estimated through a surface shape of the initial rough transparent object model.

As shown in FIG. 2, in a pre-processing step, a light correspondence, that is, a relationship between the incident light and the outgoing light may be determined, for example, the rough incident light $Q_2Q_1$ in FIG. 2 is determined to correspond to the outgoing light qc of the camera device. In a given camera device view angle, the outgoing light observed by the camera device and the source pixel points on the screen at two different positions are associated according to the acquired light correspondence, so that by connecting the two source pixel points, the incident light can be determined. At the same time, since the required light correspondence is located inside the transparent object silhouette in the view angle, all the required inverse outgoing lights can intersect the rough transparent object. It is assumed that only two refractions occur in the light. One of the refractions is the inverse outgoing light intersecting with the surface of the object, with an intersection as the front intersections. The other of the refractions is the incident light intersecting with the surface of the object, with an intersecting point as the back intersecting point. Then, the front intersecting points and the back intersecting points can be connected to restore the path through which the light travels inside the object. Also, the corresponding normal vector can be calculated according to the Snell law at each intersection, while the surface normal vector at the intersection can be determined based on the shape of the to-be-reconstructed transparent object. As shown in FIG. 2, for outgoing light from a camera imaging plane pixel q to a camera projection center c, the corresponding incident light can be obtained by connecting two source pixel points $Q_1$ and $Q_2$ on the screen at different positions. In the case where it is assumed that only two refractions occurred, and the points $p_1$ and $p_2$ are calculated from the assumed depth values. The complete light path ($Q_2$-$Q_1$-$p_2$-$p_1$-q-c) can be restored after the two points are connected. And the true light path is obtained by minimizing the difference between the surface normal vectors and the Snell normal vectors at the points $p_1$ and $p_2$.

Figure 4:
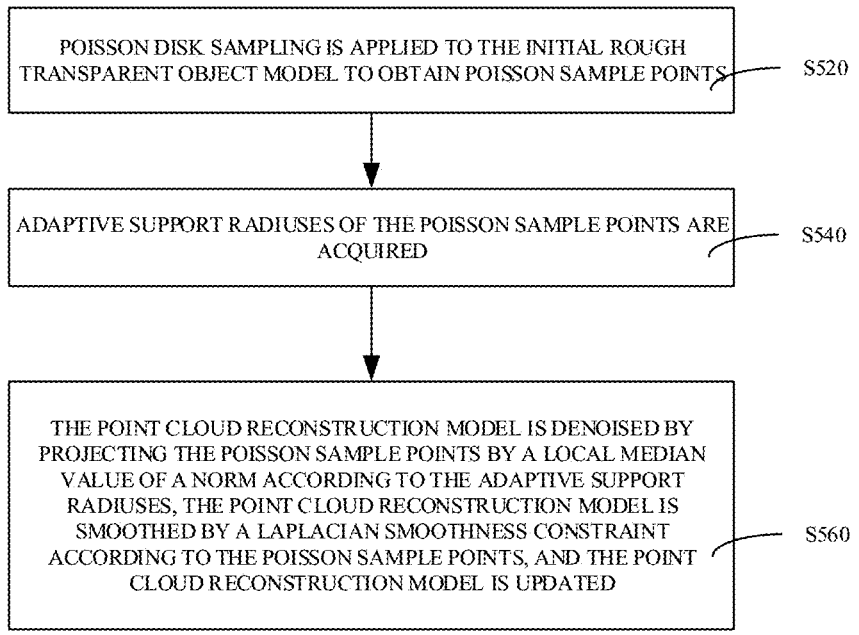
FIG. 4 is a flow diagram of step S500 according to an embodiment.

As shown in FIG. 4, in an embodiment, step S500 includes the following steps.

At step S520: Poisson disk sampling is applied to the initial rough transparent object model to obtain Poisson sample points.

At step S540: adaptive support radiuses of the Poisson sample points are acquired.

At step S560: the point cloud reconstruction model is denoised by projecting the Poisson sample points by a local median value of a norm according to the adaptive support radiuses, the point cloud reconstruction model is smoothed by a Laplacian smoothness constraint according to the Poisson sample points, and the point cloud reconstruction model is updated.

The initial rough transparent object model is used as a prior. First, uniform smooth Poisson sample points are obtained by applying Poisson disk sampling on the initial rough transparent object model, denoted as $X^0=\{x_j^0|j\in J\}$. And adaptive support radiuses of the Poisson sample points are acquired. Then, the set of points X is smoothly evolved to the set of the entire point cloud P, and the integrity and smoothness of the point cloud are maintained while recovering the geometric detail features. Inspired by the point cloud consolidation algorithm, given the set of current iteration points $X^k$, k=0, 1, . . . , the next iteration $X^{k+1}$ is defined as minimizing the following formula:

$$\sum_{j\in J}\left(\sum_{i\in I}\|x_j-p_i\|\theta(\|x_j^k-p_i\|)+\frac{\alpha}{|N_j|}\sum_{j'\in N_j}\|\Delta_j-\Delta_{j'}\|^2\right),$$

where $\Delta_j=x_j-x_j^k$ represents a displacement vector, $$\theta(\|x_j^k-p_i\|)=e^{-\|x_j^k-p_i\|^2/\left(\frac{h_j}{4}\right)^2}$$

is a fast descend function and $h_j$ represents an adaptive support radius to determine the size of the neighborhood range that has an impact on $x_j$. The weight $\alpha=7.5$ is the default value for balancing the two items. The first item in the above formula is a local median projection for denoising the unstructured point cloud data and is not sensitive to the presence of outliers. And a Laplacian smoothness constraint is introduced to the displacement vectors. The distribution of point clouds is maintained by Laplacian smoothness constraints.

At the same time, since the point cloud reconstruction model is close to the real transparent object model at the boundary of the silhouettes (convex area) and relatively different from the real model at the concave area. Thus, the provision of a smaller support radius does not effectively project a point to the concave area, and a greater support radius will smooth out the geometric details that are present near the boundaries of the silhouettes. The point cloud reconstruction model is therefore processed by adaptive support radiuses.

The adaptive neighborhood radius $h_j$ is the average distance from the point cloud P to the initial rough transparent object model X within a fixed neighborhood range of $x_j$. That is, when the estimated point cloud is close to the initial rough transparent object model, the support radiuses of the Poisson sample points in the area are small, and are great otherwise. That is, the adaptive neighborhood radius $h_j$ is defined as an average value of distances $p_i$ and $\overline{p_i}$ within a fixed neighborhood $N_{x_j}$ of $x_j$, and $\overline{p_i}$ represents an intersection of intersection between a ray of light connecting a projection center of the camera device to $p_i$ and the initial rough transparent object model:

$$h_j=\sum_{i\in N_{x_j}}\frac{1}{|N_{x_j}|}\|p_i-p_i\|, N_{x_j}=\{p_i\mid \|x_j-p_i\|\le r\},$$

where r represents a disk radius value when $X_0$ is obtained by performing Poisson disk sampling on the initial rough transparent object model. Therefore, only points $\{\overline{p_i}\}$ located within a distance of less than a range r are used for calculating $h_j$. Generally, the value of $h_j$ in the concave area is great, while the value in the area that the real model is close to the initial rough transparent object model is small. The point cloud reconstruction model is updated by the adaptive neighborhood radiuses of the point cloud reconstruction model as adaptive support radiuses. The geometric features of the concave regions of the original transparent object model can be better retained and the smoothness of the updated point cloud reconstruction model can be sufficiently maintained.

In an embodiment, S700 includes:

acquiring a binary indicator function;

constructing a first formula by the binary indicator function; and constraining consistency between the silhouettes of the initial rough transparent object model and the projections of the updated point cloud reconstruction model by the first formula.

The first formula is:

$$\min_{\Delta_j} \sum_{j \in J} \left( \sum_{v=1}^{V} \delta_j^v D(q_j^v, \partial \Omega_v) + \frac{\beta}{|N_j|} \sum_{j' \in N_j} \|\Delta_j - \Delta_{j'}\|^2 \right),$$

where $\Delta_j = x_j - x_j^k$ is a displacement vector V (defaulted to be 72, meaning that the camera device shoots every 5 degrees when rotating one circle) is the number of camera device views for acquiring silhouettes. $q_j^v = P_v \cdot x_j$ is a two-dimensional projection point representing a sample point in the camera device view angle v, where $P_v$ is a projection matrix corresponding to the view. $\partial \Omega_v$ represents a boundary of the silhouette, that is, a contour of the object in the current view angle. $\delta_j^v$ is a binary indicator function whose value is 1 when $q_j^v$ is located on the projection boundary of the reconstruction model under the view angle v, and is 0 when $q_j^v$ is not located on the projection boundary of the reconstruction model under the view angle v. $D(q_j^v, \partial \Omega)$ is a distance from a point $q_j^v$ to $\partial \Omega$ on the projection plane. $\beta = 3.5$ is the default value, configured to balance the first fitting item and the second smoothing item.

The rough transparent silhouettes and the light correspondences of the camera device views provide important information for inferring the real three-dimensional model of the object. Under a given camera view angle, the silhouettes may reflect the real boundary of the object, but may not be used to infer geometric information of the concave area. The light correspondences may be used to restore geometric information of the concave or convex areas, but is very sensitive to noise. It is therefore necessary to guarantee the consistency between the projection of the point cloud reconstruction model and its corresponding silhouettes by minimizing the first function.

In an embodiment, the acquiring of the binary indicator function includes:

constructing a topology structure according to the updated point cloud reconstruction model;

projecting the Poisson sample points to the camera device views to obtain projection points; and connecting the projection points to each other according to the topology to obtain a filled area, and determining a binary indicator function based on a boundary of the filled area.

Before acquiring the binary indicator function, it is necessary to construct the binary indicator function, by forming the topological structure by constructing K closest point map on the three-dimensional point cloud, and then acquire the Poisson sample points by applying the Poisson disk sampling. Then, projection points are obtained by projecting the Poisson sample points in the camera device view angle. The two-dimensional projection points are connected to each other and filled into areas according to the existing topology, and the value of the binary indicator function $\delta_j^v$ is determined by extracting the boundaries of the filled areas. It should be noted that during each iteration of the algorithm it is necessary to update the K closest point map and the two-dimensional filled area of the three-dimensional point cloud.

It should be understood that although the steps in FIGS. 1, 3, and 4 are sequentially displayed as indicated by arrows, these steps are not necessarily sequentially performed as indicated by arrows. Unless explicitly stated herein, the execution of these steps is not strictly sequential, and the steps may be performed in other sequences. Moreover, at least a part of the steps in FIGS. 1, 3, and 4 may include a plurality of sub-steps or stages that are not necessarily performed at the same time, but may be performed at different times, and the order of execution of the sub-steps or stages is not necessarily performed sequentially, but may be performed in turn or alternately with at least a part of other steps or sub-steps or stages of other steps.

Figure 5:
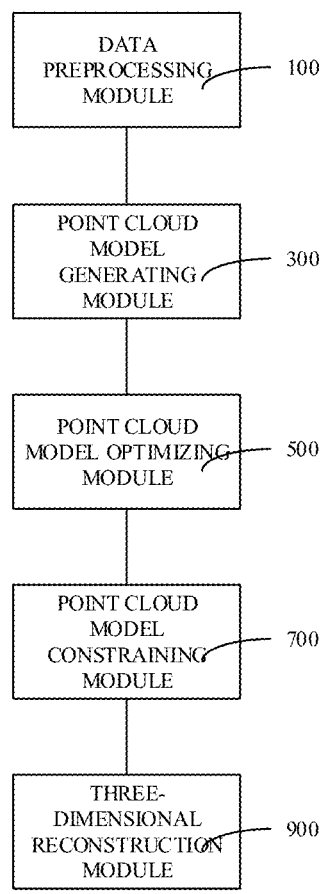
FIG. 5 is a block diagram of an apparatus for three-dimensional reconstruction of a transparent object according to an embodiment.

In an embodiment, as shown in FIG. 5, an apparatus for three-dimensional reconstruction is provided, which includes:

a data preprocessing module 100 configured to acquire silhouettes and light correspondences of a to-be-reconstructed transparent object under different viewing directions, acquire an initial rough transparent object model of the to-be-reconstructed transparent object, and filter out light rays involved in multiple refractions and total reflections by backward ray tracing;

a point cloud model generating module 300 configured to acquire surface normal vectors and Snell normal vectors of the initial rough transparent object model of the to-be-reconstructed transparent object in camera device views, perform a first optimization on the initial rough transparent object model by constraining consistency between the surface normal vectors and the Snell normal vectors of the initial rough transparent object model in the camera device views, and acquire a point cloud reconstruction model;

a point cloud model optimizing module 500 configured to acquire Poisson sample points of the initial rough transparent object model, and update the point cloud reconstruction model according to the Poisson sample points;

a point cloud model constraining module 700 configured to perform a second optimization on the updated point cloud reconstruction model according to the silhouettes of the to-be-reconstructed transparent object and the projections of the updated point cloud reconstruction model; and a three-dimensional reconstruction module 900 configured to perform a three-dimensional reconstruction on the optimized point cloud reconstruction model after the second optimization to obtain a three-dimensional model.

In an embodiment, the apparatus further includes a reconstruction iterating module configured to: reuse the obtained three-dimensional model as an initial rough transparent object model, control the normal vector acquiring module 300 to re-perform the operation of acquiring the surface normal vectors and the Snell normal vectors of the initial rough transparent object model of the to-be-reconstructed transparent object in the camera device views, and count the number of times of return; and when the number of times of return reaches a preset number of times, stop controlling the normal vector acquiring module to perform the operation of acquiring the surface normal vectors and the Snell normal vectors of the initial rough transparent object model of the to-be-reconstructed transparent object in the camera device views.

In an embodiment, the apparatus further includes a model acquiring module configured to: acquire the silhouettes of the to-be-reconstructed transparent object at viewing directions; and acquire an initial rough transparent object model by spatial carving algorithms according to the silhouettes.

In an embodiment, the point cloud model generating module 300 is configured to: perform backward ray tracing of the initial rough transparent object model in the camera device views to obtain a front intersection and a back intersection of intersection between each ray of light and the initial rough transparent object model; calculate corresponding Snell normal vectors at the front intersection and the back intersection according to the Snell law; and acquire surface normal vectors at the front intersections and the back intersections through a surface shape of the initial rough transparent object model.

In an embodiment, the point cloud model update module 500 is configured to configured to apply Poisson disk sampling to the initial rough transparent object model to obtain Poisson sample points; acquire adaptive support radiuses of the Poisson sample points; and denoise the point cloud reconstruction model by projecting the Poisson sample points by a local median value of a norm according to the adaptive support radiuses, and smooth the point cloud reconstruction model by a Laplacian smoothness constraint according to the Poisson sample points, and update the point cloud reconstruction model.

In an embodiment, the point cloud model constraining module 700 includes an indicator function acquiring unit configured to acquire a binary indicator function; a first formula constructing unit configured to construct a first formula by the binary indicator function; and a model constraining unit configured to constrain consistency between the silhouettes of the initial rough transparent object model and the projections of the updated point cloud reconstruction model by the first formula.

The first formula is:

$$\min_{\Delta_j} \sum_{j \in J} \left( \sum_{v=1}^{V} \delta_j^v D(q_j^v, \partial \Omega_v) + \frac{\beta}{|N_j|} \sum_{j' \in N_j} \|\Delta_j - \Delta_{j'}\|^2 \right),$$

where $\Delta_j = x_j - x_j^k$ is a displacement vectors. V (defaulted to be 72, meaning that the camera device shoots every 5 degrees when rotating one circle) is the number of camera device views for acquiring silhouettes. $q_j^v = P_v \cdot x_j$ is a two-dimensional projection points representing a sample point in the camera device view angle v, and $P_v$ is a projection matrix corresponding to the view. $\partial \Omega_v$ represents a boundary of the silhouette, that is, a sketch of the object in the current view angle. $\delta_j^v$ is a binary indicator function whose value is 1 when $q_j^v$ is located on the projection boundary of the reconstruction model under the view angle v, and is 0 when $q_j^v$ is not located on the projection boundary of the reconstruction model under the view angle v. $D(q_j^v, \partial \Omega)$ is a distance from point $q_j^v$ to $\partial \Omega$ on the projection plane. $\beta = 3.5$ is the default value, configured to balance the first fitting item and the second smoothing item.

In an embodiment, the indicator function acquiring unit is configured to: construct a topology structure according to the updated point cloud reconstruction model; project the Poisson sample points to the camera device views to obtain projection points; and connect the projection points to each other according to the topology to obtain a filled area, and determine a binary indicator function based on a boundary of the filled area.

For the specific definition of the apparatus for three-dimensional reconstruction of a transparent object, reference can be made to the foregoing definition of the method of three-dimensional reconstruction of a transparent object and is omitted for brevity. The various modules in the apparatus for three-dimensional reconstruction of a transparent object described above may be implemented in whole or in part by software, hardware, and combinations thereof. The modules may be embedded in or independent from a processor in the computer device and in the form of hardware, or may be stored in a memory in the computer device and in the form of software to be called by the processor to perform the operations corresponding to the modules.

Figure 6:
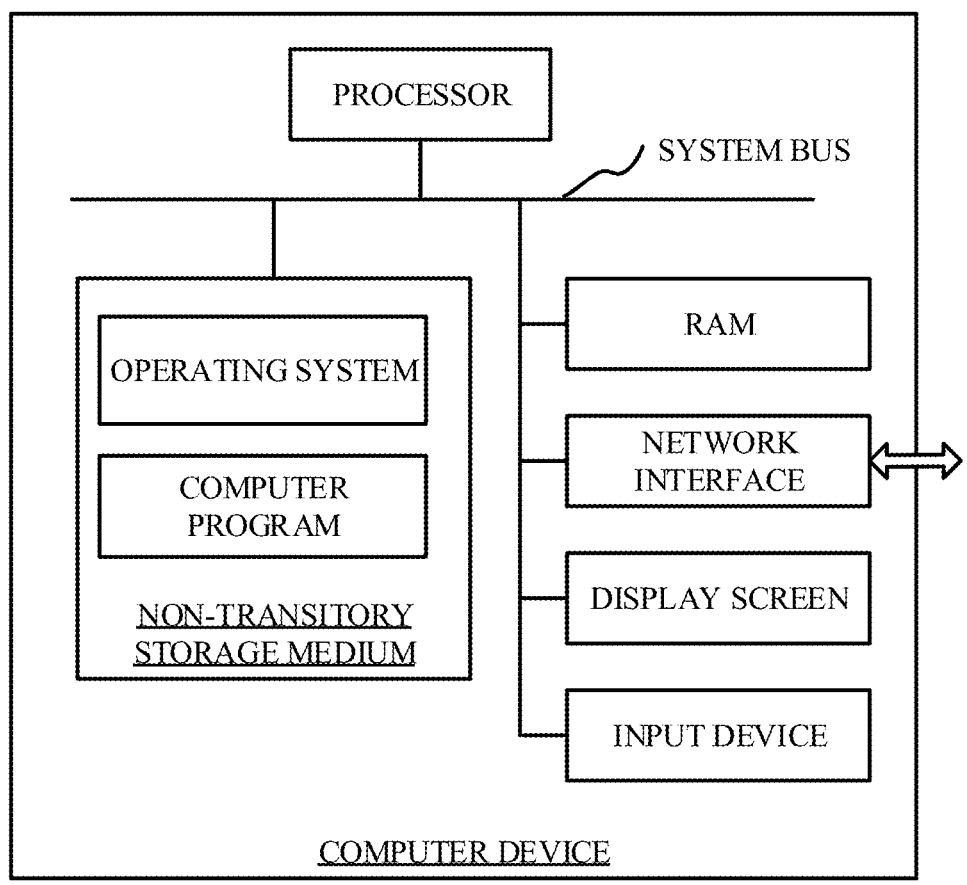
FIG. 6 is a schematic diagram of a computer device according to an embodiment.

In an embodiment, a computer device is provided, which may be a terminal. The internal structure diagram of the computer device is illustrated in FIG. 6. The computer device includes a processor, a memory, a network interface, a display screen, and an input device connected through a system bus. The processor of the computer device is configured to provide computing and control capabilities. The memory of the computer device includes non-volatile storage medium and a Random Access Memory (RAM). The non-transitory storage medium stores an operating system and a computer program. The RAM provides an environment for the operation of an operating system and the computer program in the non-volatile storage medium. The network interface of the electronic device is configured to communicate with external terminals via a network connection. The computer program is executed by the processor to implement a method of three-dimensional reconstruction of a transparent object. The display screen of the computer device may be a liquid crystal display screen or an electronic ink display screen, and the input device of the computer device may be a touch layer covered on the display screen, or be a key, a trackball or a touch pad set on the housing of the computer device, or may be an external keyboard, touch pad or mouse.

Those skilled in the art will appreciate that the structure shown in FIG. 6 is merely a block diagram of a portion of the structure associated with the solution of the application, and does not constitute a limitation on the computer device to which the solution of the present disclosure is applied, a particular computer device may include more or fewer components, or combine certain components, or with a different arrangement of components.

In an embodiment, a computer device is provided, which include a memory and a processor. The memory stores a computer program which when executed by the processor causes the processor to perform the following steps:

acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;

acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;

acquiring Poisson sample points of the initial rough transparent object model, and updating the point cloud reconstruction model according to the Poisson sample points;

performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

In an embodiment, the computer program when executed by the processor further causes the processor to: reuse the obtained three-dimensional model as an initial rough transparent object model, return to the acquiring the surface normal vectors and the Snell normal vectors of the initial rough transparent object model of the to-be-reconstructed transparent object in the camera device views, and count the number of times of return; and when the number of times of return reaches a preset number of times, stop returning to the step of acquiring the surface normal vectors and the Snell normal vectors of the initial rough transparent object model of the to-be-reconstructed transparent object in the camera device views.

In an embodiment, the computer program when executed by the processor further causes the processor to: acquire the silhouettes of the to-be-reconstructed transparent object at each viewing direction; and acquire an initial rough transparent object model by spatial carving algorithms according to the silhouettes.

In an embodiment, the computer program when executed by the processor further causes the processor to: perform backward ray tracing of the initial rough transparent object model in the camera device views to obtain a front intersection and a back intersection of intersection between each ray of light and the initial rough transparent object model; calculate corresponding Snell normal vectors at the front intersection and the back intersection according to the Snell law; and acquire surface normal vectors at the front intersection and the back intersection through a surface shape of the initial rough transparent object model.

In an embodiment, the computer program when executed by the processor further causes the processor to: apply Poisson disk sampling to the initial rough transparent object model to obtain Poisson sample points; acquire adaptive support radiuses of the Poisson sample points; and denoise the point cloud reconstruction model by projecting the Poisson sample points by a local median value of a norm according to the adaptive support radiuses, smooth the point cloud reconstruction model by a Laplacian smoothness constraint according to the Poisson sample points, and update the point cloud reconstruction model.

In an embodiment, the computer program when executed by the processor further causes the processor to: acquire a binary indicator function; construct a first formula by the binary indicator function; and constrain consistency between the silhouettes of the initial rough transparent object model and the projections of the updated point cloud reconstruction model by the first formula.

The first formula is:

$$\min_{\Delta_j} \sum_{j \in J} \left( \sum_{v=1}^{V} \delta_j^v D(q_j^v, \partial \Omega_v) + \frac{\beta}{|N_j|} \sum_{j' \in N_j} \|\Delta_j - \Delta_{j'}\|^2 \right)$$

where $\Delta_j = x_j - x_j^k$ is a displacement vectors. V (defaulted to be 72, meaning that the camera device shoots every 5 degrees when rotating one circle) is the number of camera device views for acquiring silhouettes. $q_j^v = P_v \cdot x_j$ is a two-dimensional projection points representing a sample point in the camera device view angle v, and $P_v$ is a projection matrix corresponding to the view. $\partial \Omega_v$ represents a boundary of the silhouette, that is, a sketch of the object in the current view angle. $\delta_j^v$ is a binary indicator function whose value is 1 when $q_j^v$ is located on the projection boundary of the reconstruction model under the view angle v, and is 0 when $q_j^v$ is not located on the projection boundary of the reconstruction model under the view angle v. $D(q_j^v, \partial \Omega)$ is a distance from point $q_j^v$ to $\partial \Omega$ on the projection plane. $\beta = 3.5$ is the default value.

In an embodiment, the computer program when executed by the processor further causes the processor to: construct a topology structure according to the updated point cloud reconstruction model; project the Poisson sample points to the camera device views to obtain projection points; and connect the projection points to each other according to the topology to obtain a filled area, and determine a binary indicator function based on a boundary of the filled area.

In an embodiment, a computer-readable storage medium is provided. The computer-readable storage medium stores a computer program when executed on a processor causes the processor to perform the following steps:

acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;

acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;

acquiring Poisson sample points of the initial rough transparent object model, and updating the point cloud reconstruction model according to the Poisson sample points;

performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

In an embodiment, the computer program when executed by the processor further causes the processor to: reuse the obtained three-dimensional model as an initial rough transparent object model, return to the acquiring the surface normal vectors and the Snell normal vectors of the initial rough transparent object model of the to-be-reconstructed transparent object in the camera device views, and count the number of times of return; and when the number of times of return reaches a preset number of times, stop returning to the step of acquiring the surface normal vectors and the Snell normal vectors of the initial rough transparent object model of the to-be-reconstructed transparent object in the camera device views.

In an embodiment, the computer program when executed by the processor further causes the processor to: acquire the silhouettes of the to-be-reconstructed transparent object at each viewing direction; and acquire an initial rough transparent object model by spatial carving algorithms according to the silhouettes.

In an embodiment, the computer program when executed by the processor further causes the processor to: perform backward ray tracing of the initial rough transparent object model in the camera device views to obtain a front intersection and a back intersection of intersection between each ray of light and the initial rough transparent object model; calculate corresponding Snell normal vectors at the front intersection and the back intersection according to the Snell law; and acquire surface normal vectors at the front intersection and the back intersection through a surface shape of the initial rough transparent object model.

In an embodiment, the computer program when executed by the processor further causes the processor to: apply Poisson disk sampling to the initial rough transparent object model to obtain Poisson sample points; acquire adaptive support radiuses of the Poisson sample points; and denoise the point cloud reconstruction model by projecting the Poisson sample points by a local median value of a norm according to the adaptive support radiuses, smooth the point cloud reconstruction model by a Laplacian smoothness constraint according to the Poisson sample points, and update the point cloud reconstruction model.

In an embodiment, the computer program when executed by the processor further causes the processor to: acquire a binary indicator function; construct a first formula by the binary indicator function; and constrain consistency between the silhouettes of the initial rough transparent object model and the projections of the updated point cloud reconstruction model by the first formula.

The first formula is:

$$\min_{\Delta_j} \sum_{j \in J} \left( \sum_{v=1}^{V} \delta_j^v D(q_j^v, \partial \Omega_v) + \frac{\beta}{|N_j|} \sum_{j' \in N_j} \|\Delta_j - \Delta_{j'}\|^2 \right)$$

where $\Delta_j = x_j - x_j^k$ is a displacement vectors. V (defaulted to be 72, meaning that the camera device shoots every 5 degrees when rotating one circle) is the number of camera device views for acquiring silhouettes. $q_j^v = P_v \cdot x_j$ is a two-dimensional projection point representing the a sample point in the camera device view angle v, and $P_v$ is a projection matrix corresponding to the view. $\partial \Omega_v$ represents a boundary of the silhouette, that is, a sketch of the object in the current view angle. $\delta_j^v$ is a binary indicator function whose value is 1 when $q_j^v$ is located on the projection boundary of the reconstruction model under the view angle v, and is 0 when $q_j^v$ is not located on the projection boundary of the reconstruction model under the view angle v. $D(q_j^v, \partial \Omega)$ is a distance from a point $q_j^v$ to $\partial \Omega$ on the projection plane. $\beta = 3.5$ is the default value.

In an embodiment, the computer program when executed by the processor further causes the processor to: construct a topology structure according to the updated point cloud reconstruction model; project the Poisson sample points to the camera device views to obtain projection points; and connect the projection points to each other according to the topology to obtain a filled area, and determine a binary indicator function based on a boundary of the filled area.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

The invention claimed is:

1. A method for three-dimensional reconstruction of a transparent object, the method comprising:
   acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;
   acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;
   acquiring Poisson sample points of the initial rough transparent object model, and updating the point cloud reconstruction model according to the Poisson sample points;
   performing a second optimization on the updated point cloud reconstruction model according to the silhouettes of the to-be-reconstructed transparent object and projections of the updated point cloud reconstruction model; and performing a three-dimensional reconstruction on the optimized point cloud reconstruction model after the second optimization to obtain a three-dimensional model.

2. The method of claim 1, wherein after the performing the three-dimensional reconstruction on the optimized point cloud reconstruction model after second optimization to obtain the three-dimensional model, the method further comprises:
reusing the obtained three-dimensional model as an initial rough transparent object model, returning to the acquiring the surface normal vectors and the Snell normal vectors of the initial rough transparent object model of the to-be-reconstructed transparent object in the camera device views, and counting the number of times of return; and
when the number of times of return reaches a preset number of times, stopping returning to the acquiring the surface normal vectors and the Snell normal vectors of the initial rough transparent object model of the to-be-reconstructed transparent object in the camera device views.

3. The method of claim 1, wherein prior to the acquiring the surface normal vectors and the Snell normal vectors of the initial rough transparent object model of the to-be-reconstructed transparent object in the camera device views, the method further comprises:
acquiring the silhouettes of the to-be-reconstructed transparent object at each viewing direction; and
acquiring an initial rough transparent object model by spatial carving algorithms according to the silhouettes.

4. The method of claim 1, wherein the acquiring surface normal vectors and Snell normal vectors of the initial rough transparent object model of the to-be-reconstructed transparent object in the camera device views comprises:
performing backward ray tracing of the initial rough transparent object model in the camera device views to obtain a front intersection and a back between each ray of light and the initial rough transparent object model;
calculating corresponding Snell normal vectors at the front intersection and the back intersection according to the Snell law; and
acquiring surface normal vectors at the front intersection and the back intersection through a surface shape of the initial rough transparent object model.

5. The method of claim 1, wherein the acquiring the Poisson sample points of the initial rough transparent object model, and updating the point cloud reconstruction model according to the Poisson sample points comprises:
applying Poisson disk sampling to the initial rough transparent object model to obtain Poisson sample points;
acquiring adaptive support radiuses of the Poisson sample points; and
denoising the point cloud reconstruction model by projecting the Poisson sample points by a local median value of a norm according to the adaptive support radiuses, smoothing the point cloud reconstruction model by a Laplacian smoothness constraint according to the Poisson sample points, and updating the point cloud reconstruction model.

6. The method of claim 5, wherein the denoising the point cloud reconstruction model by projecting the Poisson sample points by the local median value of the norm according to the adaptive support radiuses, and smoothing the point cloud reconstruction model by the Laplacian smoothness constraint according to the Poisson sample points, and updating the point cloud reconstruction model comprises:
denoising and smoothing the point cloud reconstruction model by a following formula, and updating the point cloud reconstruction model, $$\sum_{j \in J} \left( \sum_{i \in I} \|x_j - p_i\| \theta(\|x_j^k - p_i\|) + \frac{\alpha}{|N_j|} \sum_{j' \in N_j} \|\Delta_j - \Delta_{j'}\|^2 \right),$$

where $X^0 = \{x_j^0 | j \in J\}$ is a sample point, $P = p_i | i \in I$ is a point cloud, $\Delta_j = x_j - x_j^k$ represents a displacement vector, $$\theta(\|x_j^k - p_i\|) = e^{-\|x_j^k - p_i\|^2 / \left(\frac{h_j}{4}\right)^2}$$

is a fast descend function, $h_j$ represents an adaptive support radius to determine a size of a neighborhood range that has an impact on $x_j$, a weight $\alpha = 7.5$ is a default value, and $N_j$ represents a neighborhood of a pixel j.

7. The method of claim 5, wherein the acquiring the adaptive support radiuses of Poisson sample points comprises:
acquiring adaptive neighborhood radiuses of Poisson sample points by a following formula, $$h_j = \sum_{i \in N_{x_j}} \frac{1}{|N_{x_j}|} \|p_i - p_i\|, N_{x_j} = \{p_i \mid \|x_j - p_i\| \le r\},$$

where r represents a disk radius value when $X_0$ is obtained by performing Poisson disk sampling on the initial rough transparent object model, an adaptive neighborhood radius $h_j$ is defined as an average value of distances $p_i$ and $\overline{p}_\iota$ within a fixed neighborhood $N_{x_j}$ of $x_j$, and $\overline{p}_\iota$ represents an intersection between a ray of light connecting a projection center of the camera device to $p_i$ and the initial rough transparent object model.

8. The method of claim 1, wherein the acquiring silhouettes of the initial rough transparent object model, and constraining the updated point cloud reconstruction model according to the silhouettes of the initial rough transparent object model and the projections of the updated point cloud reconstruction model comprises:
acquiring a binary indicator function;
constructing a first formula by the binary indicator function; and
constraining consistency between the silhouettes of the initial rough transparent object model and the projections of the updated point cloud reconstruction model by the first formula,
wherein the first formula is:

$$\min_{\Delta_j} \sum_{j \in J} \left( \sum_{v=1}^{V} \delta_j^v D(q_j^v, \partial \Omega_v) + \frac{\beta}{|N_j|} \sum_{j' \in N_j} \|\Delta_j - \Delta_{j'}\|^2 \right),$$

where $\Delta_j = x_j - x_j^k$ is a displacement vector, V (defaulted to be 72, meaning that the camera device shoots every 5 degrees when rotating one circle) is the number of camera device views for acquiring the silhouettes, $q_j^v = P_v \cdot x_j$ is a two-dimensional projection point representing a sample point in the camera device view angle v, and $P_v$ is a projection matrix corresponding to the view; $\partial\Omega_v$ represents a boundary of the silhouette, that is, a sketch of the object in the current view angle; $\delta_j^v$ is a binary indicator function whose value is 1 when $q_j^v$ is located on the projection boundary of the reconstruction model under the view angle v, and is 0 when $q_j^v$ is not located on the projection boundary of the reconstruction model under the view angle v; $D(q_j^v, \partial\Omega)$ is a distance from a point $q_j^v$ to $\partial\Omega$ on the projection plane; $\beta=3.5$ is a default value; and $N_j$ represents a neighborhood of a pixel j.

9. The method of claim 8, the acquiring the binary indicator function comprising:
   constructing a topology structure according to the updated point cloud reconstruction model;
   projecting the Poisson sample points to the camera device views to obtain projection points; and
   connecting the projection points to each other according to the topology structure to obtain a filled area, and determining a binary indicator function based on a boundary of the filled area.

10. A computer device comprising a memory and a processor, the memory storing a computer program which when executed on the processor causes the processor to perform the steps of:
   acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;
   acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;
   acquiring Poisson sample points of the initial rough transparent object model, and updating the point cloud reconstruction model according to the Poisson sample points;
   performing a second optimization on the updated point cloud reconstruction model according to the silhouettes of the to-be-reconstructed transparent object and projections of the updated point cloud reconstruction model; and
   performing a three-dimensional reconstruction on the optimized point cloud reconstruction model after the second optimization to obtain a three-dimensional model.

11. A non-transitory computer-readable storage medium storing a computer program which when executed on a processor causes the processor to perform the steps of:
   acquiring silhouettes and light correspondences of a to-be-reconstructed transparent object under different viewing directions, acquiring an initial rough transparent object model of the to-be-reconstructed transparent object, and filtering out light rays involved in multiple refractions and total reflections by backward ray tracing;
   acquiring surface normal vectors and Snell normal vectors of the initial rough transparent object model of the to-be-reconstructed transparent object in camera device views, performing a first optimization on the initial rough transparent object model by constraining consistency between the surface normal vectors and the Snell normal vectors of the initial rough transparent object model in the camera device views, and acquiring a point cloud reconstruction model;
   acquiring Poisson sample points of the initial rough transparent object model, and updating the point cloud reconstruction model according to the Poisson sample points;
   performing a second optimization on the updated point cloud reconstruction model according to the silhouettes of the to-be-reconstructed transparent object and projections of the updated point cloud reconstruction model; and
   performing a three-dimensional reconstruction on the optimized point cloud reconstruction model after the second optimization to obtain a three-dimensional model.

\* \* \* \* \*